May 15, 1934. O. G. SIMMONS 1,958,550
GEAR TESTING AND LAPPING MACHINE
Filed Sept. 12, 1929 7 Sheets-Sheet 4
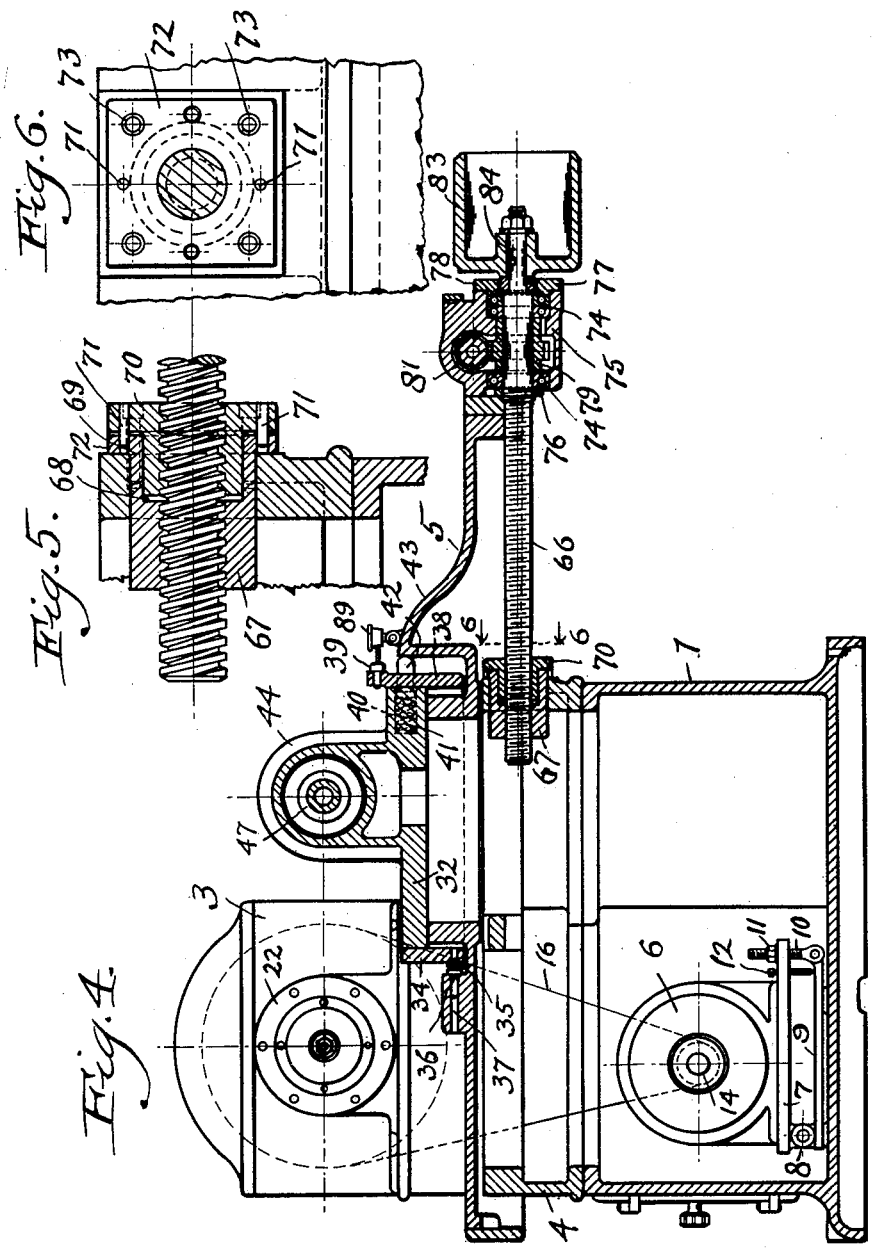
INVENTOR
Oliver G. Simmons
Kwis Hudson & Kent
attys.

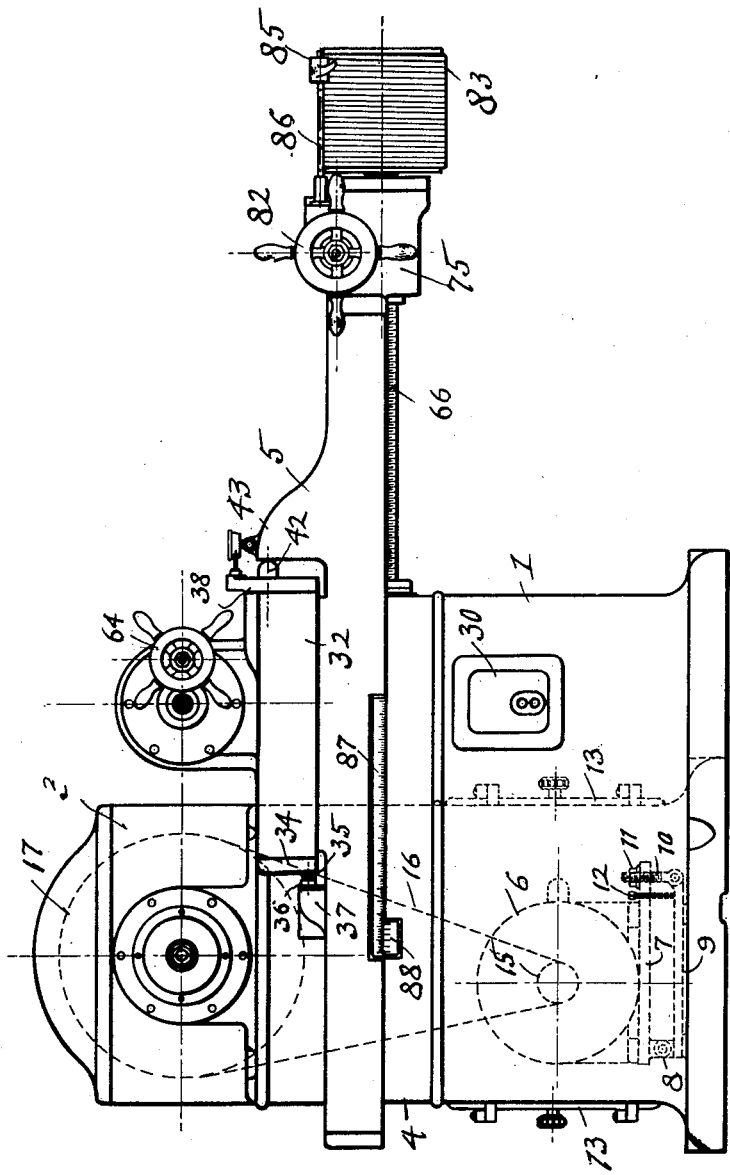

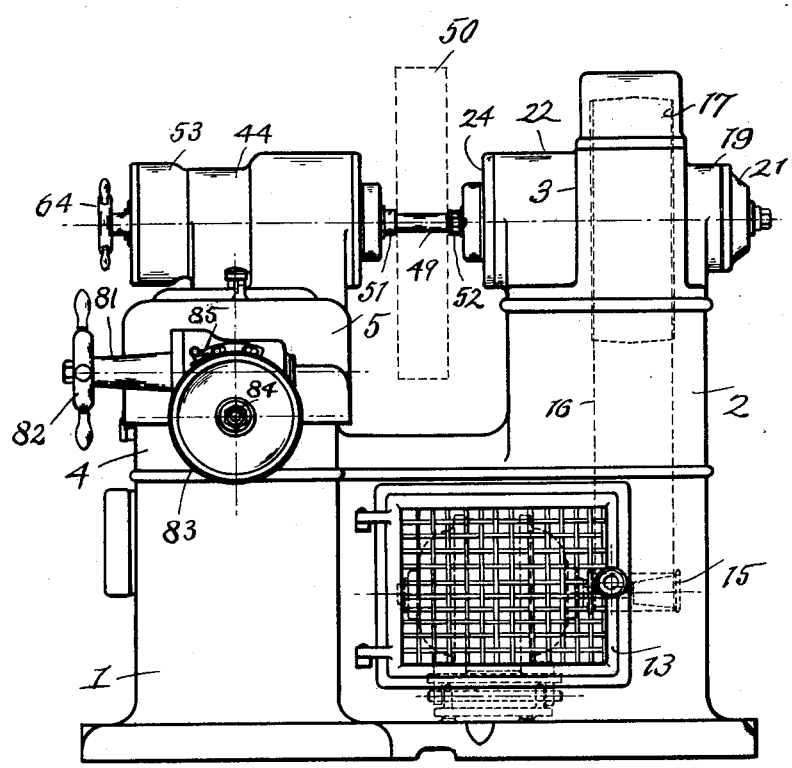

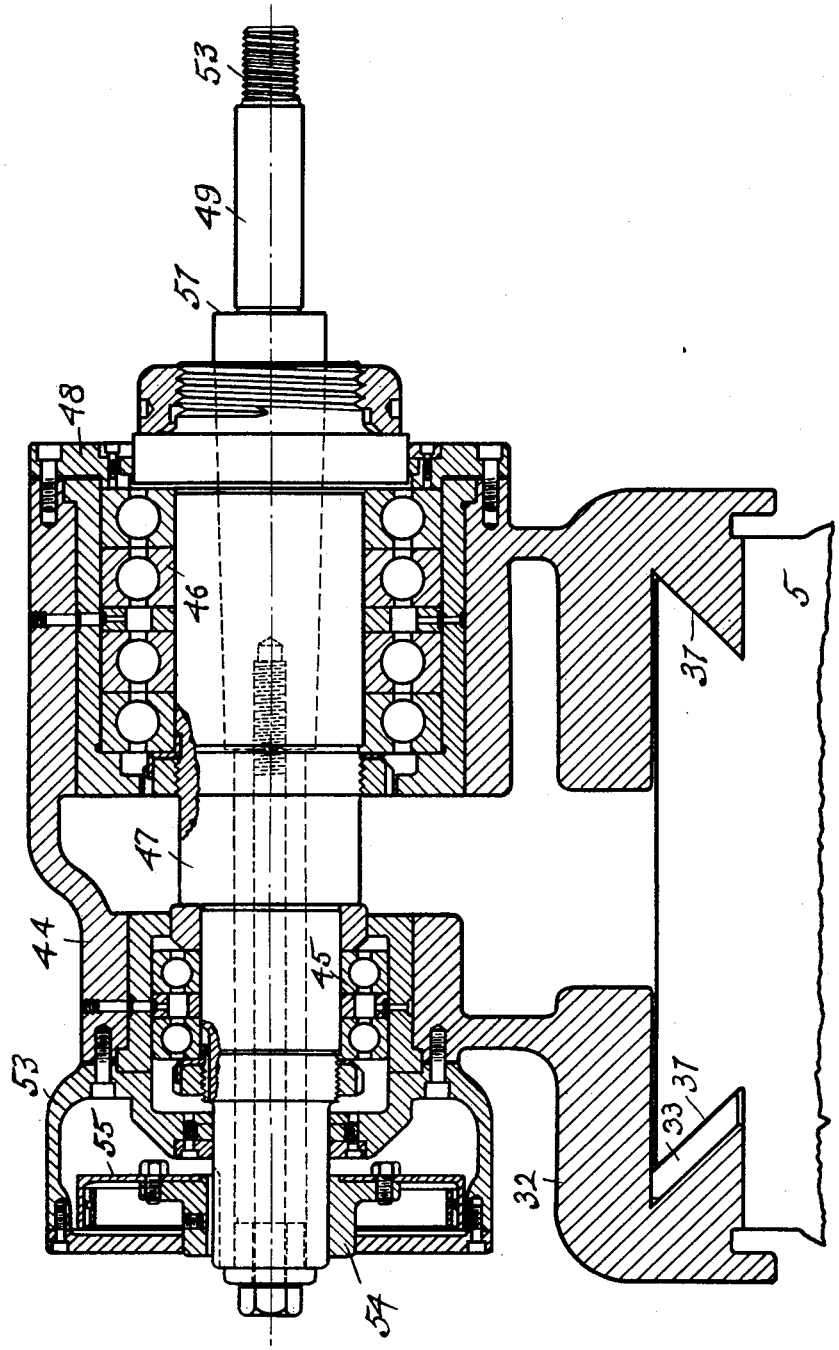

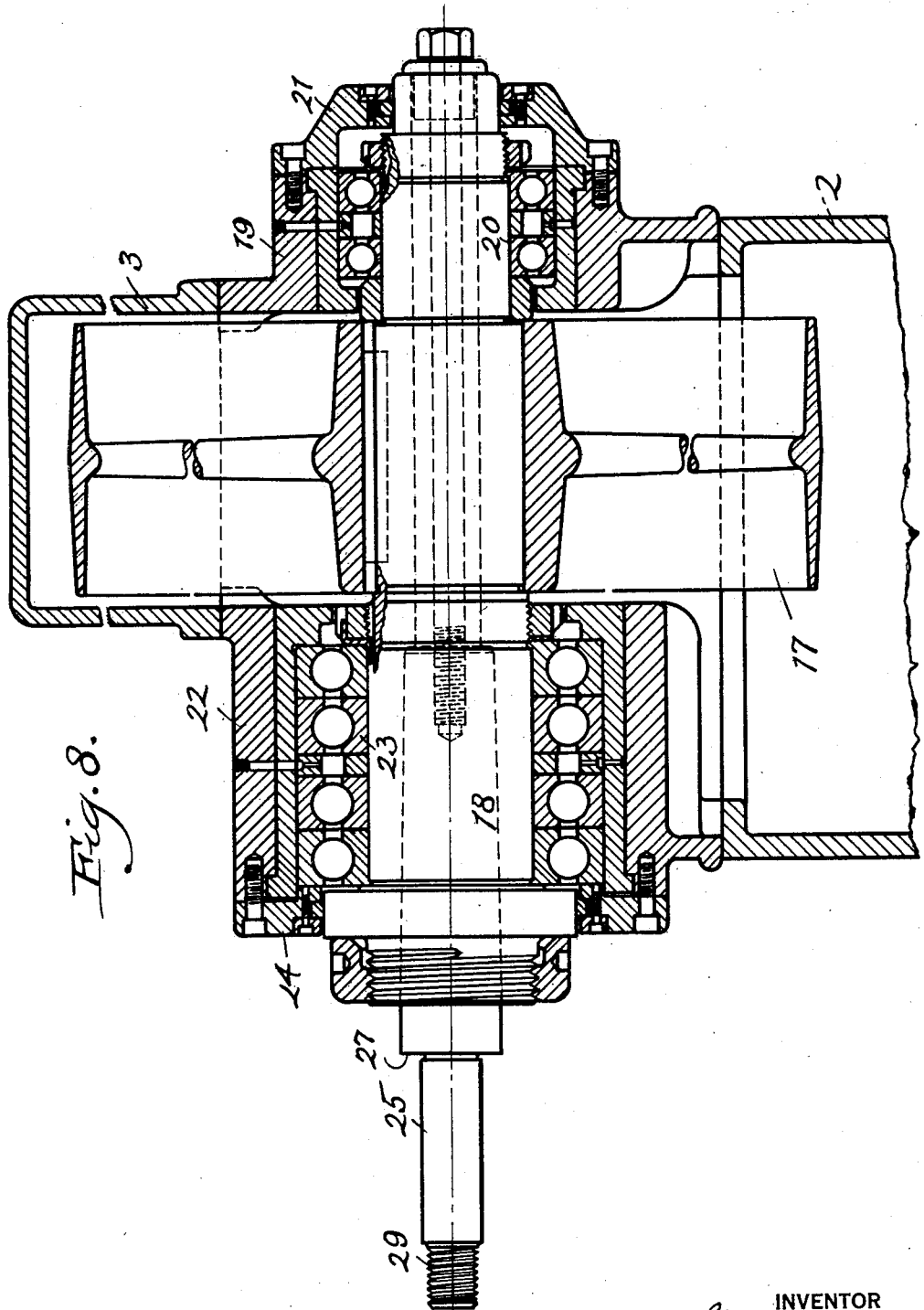

May 15, 1934.  O. G. SIMMONS  1,958,550
GEAR TESTING AND LAPPING MACHINE
Filed Sept. 12, 1929   7 Sheets-Sheet 7
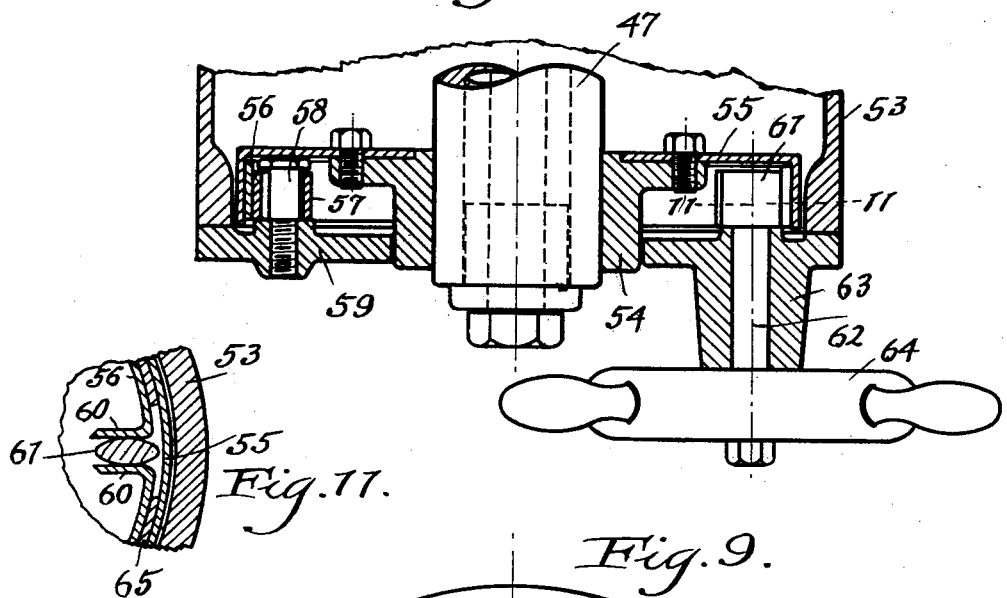
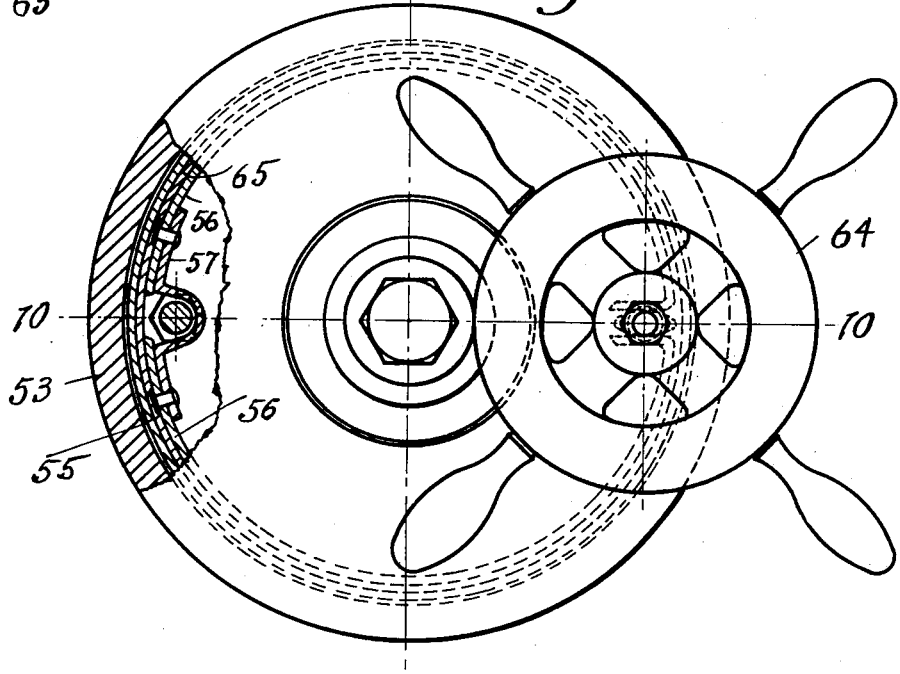
INVENTOR
Oliver G. Simmons
Kwis Hudson & Kent
attys.

Patented May 15, 1934

1,958,550

UNITED STATES PATENT OFFICE 1,958,550

GEAR TESTING AND LAPPING MACHINE

Oliver G. Simmons, Lakewood, Ohio, assignor to The National Tool Company, Cleveland, Ohio, a corporation of Ohio Application September 12, 1929, Serial No. 392,149

3 Claims. (Cl. 73—51)

This invention relates to a gear testing and lapping machine.

An object of the invention is to provide a gear lapping machine for testing gears for silence of operation and for the in and out movement of the gears caused by irregularities therein, which is simple in construction and is easily, accurately and quickly adjusted for operation.

Another object is to provide in a machine of this character means for imposing readily and at will a load upon one of the gears.

A further object is to provide means for quickly and accurately adjusting the machine for different center distances between the gears.

A still further object is to provide means whereby the setting of the machine with respect to the center distance between the gears may be readily ascertained by the operator at a plurality of different positions on one side of the machine.

An additional object is to provide in a machine of this character means for accurately registering or indicating the in and out movement of the gears when running in mesh.

A still further additional object is to provide a machine of this character which is so constructed that the operator may make all the necessary adjustments, ascertain the accuracy of the settings or adjustments, set the machine in operation and read the indications of the in and out movement of the gears, all from one side of the machine.

Still further additional objects and advantages will become apparent hereinafter during the following detailed description of an embodiment of the invention.

The embodiment of the invention which is to be described in detail herein is illustrated in the accompanying drawings, wherein, Fig. 1 is a front elevational view of the machine;

Fig. 2 is a side elevational view thereof looking from the right hand side of Fig. 1;

Fig. 3 is a top plan view of the machine;

Fig. 4 is a vertical sectional view taken approximately on line 4—4 of Fig. 3;

Fig. 5 is an enlarged detail sectional view of a portion of the machine illustrated in Fig. 4;

Fig. 6 is a sectional view taken on line 6—6 of Fig. 4 looking in the direction of the arrows;

Fig. 7 is a vertical sectional view taken approximately on line 7—7 of Fig. 3 looking in the direction of the arrows;

Fig. 8 is a vertical sectional view taken approximately on line 8—8 of Fig. 3 looking in the direction of the arrows;

Fig. 9 is a front elevational view of a portion of the machine, certain parts thereof being broken away and shown in section;

Fig. 10 is a horizontal section taken at approximately line 10—10 of Fig. 9; and Fig. 11 is a vertical section taken approximately on line 11—11 of Fig. 10.

The machine has a substantially L-shaped base 1, from one arm of which extends upwardly a portion 2 supporting upon its top the housing 3 which contains the bearings for the shaft or spindle supporting the positively driven gear. The other arm of the base 1 has secured upon its upper side a bed 4 provided with ways upon which a slide 5 is mounted so as to be adjustable longitudinally or lengthwise of the bed transversely to the spindle mounted in the housing 3. The base 1 is hollow and contains in the arm having the extension 2 a motor 6 which drives the positively driven gear in a manner later to be referred to. The motor is shown as mounted upon a motor base 7 pivoted at one end by a pivotal connection 8 to a fixed base 9 and secured at its other end by clamping bolts 10 pivoted to the base 9 and connected to the motor base 7 by means of clamping nuts 11. Inwardly of the bolts 10 are stop bolts 12 which are adjustable so as to permit the motor base 7 to be raised or lowered, as desired, in order to tighten or loosen the belt forming the driving connection between the motor and the shaft upon which the positively driven gear is mounted. Of course, this particular mounting of the motor does not form a part of the present invention and there is no intention to limit the disclosure of this application to such a mounting.

The base 1 is provided on each side thereof with screen doors 13 providing access to the motor, as well as ventilation for the same. The motor shaft 14 is provided at its rear end with a pulley 15 for driving a belt 16 which extends upwardly through the base and the extension 2 and passes around a pulley 17 keyed to the shaft or spindle 18, which shaft is rotatably mounted in the housing 3 and extends through and beyond the same toward the front of the machine, the part of the spindle 18 extending beyond the housing 3 being adapted to receive the positively driven gear.

The housing 3 which is fixedly connected to the top of the extension 2 is provided centrally of its rear side with a rearwardly extending portion 19 supporting an anti-friction bearing 20 for the rear end of the shaft 18 and closed by a cap member 21. The front end of the housing is likewise provided with an extension 22 which supports an anti-friction bearing 23 for the shaft 18 intermediate the forwardly and outwardly extending end thereof and the pulley 17, the extension 22 being also provided on its front end with a closure cap 24. The forward and outwardly extending end of the shaft 18 is reduced as shown at 25, whereby a gear 26, indicated in dotted lines in Fig. 3, may be secured to the reduced portion 25 of the shaft between the shoulder 27 and a nut 28 screwed upon the threaded end 29 of the shaft, the gear 26 being fixed to the shaft either by means of keys, pins, or other well-known means so as to rotate therewith when the motor 6 is in operation. The operation of the motor 6 is controlled by means of a suitable switch 30 arranged in the front wall of the base 1, as clearly shown in Fig. 1.

As previously mentioned, a bed 4 is arranged upon the top of the arm of the base that is at approximate right angles to the arm thereof carrying the upward extension 2, such bed 4 being provided with ways upon which the slide 5 may travel. The slide 5 is substantially longer in length than is the bed 4 and has a portion extending outwardly beyond the bed on the right hand side of the machine, as viewed in Figs. 1, 3 and 4. Intermediate its ends the slide 5 is provided with a pair of ways 31 extending longitudinally or lengthwise of the slide 5, which ways slidably receive and guide a slide 32 having an undercut longitudinally extending groove 33 in its under surface fitting over the ways 31 on the slide 5. The left hand end of the slide 32, as viewed in Figs. 1 and 4, is provided with a transversely extending plate 34 connecting the sides of the slide, which plate carries adjacent its lower end an abutment plug 35 adapted to cooperate with a similar plug 36 mounted in an upwardly extending portion 37 formed on the upper surface of the slide 5. The engagement of the abutment plug 35 with the plug 36 limits in one direction the relative movement of the slide 32 with respect to the slide 5. The other end of the slide is likewise provided with a transversely extending end plate 38, such plate, however, extending slightly above the upper surface of the slide so as to carry a member 39 forming an operative connection with a dial indicating device 89 carried by the slide 5 and later to be referred to.

A plurality of counterbores 40 are formed in the end of the slide 32 upon which the plate 38 is arranged, such counterbores housing springs 41 which bear against the inner ends of plungers 42 extending outwardly therefrom through the plate 38 and engaging against an upwardly extending abutment portion 43 formed on the slide 5. The strength of the springs 41 is such that the slide 32 is normally maintained by the engagement of the plungers 42 with the abutment portion 43 at its extreme limit of movement toward the left (as viewed in the drawings) with the abutment plug 35 in engagement with the plug 36 carried by the slide 5. This arrangement results in the slide 32 being normally fixed with respect to the slide 5 and moving therewith when the latter is moved backwardly or forwardly for the purposes of obtaining certain adjustments later to be referred to. Upon the top of the slide 32 and intermediate the ends thereof a transversely extending housing 44 is secured, such housing supporting by means of spaced anti-friction bearings 45 and 46 a shaft or spindle 47 extending longitudinally through the housing transversely of the slide 32. The rear end of the shaft or spindle 47 extends outwardly and rearwardly of the cover plate 48 enclosing the rear end of the housing 44 and is provided with a reduced portion 49 adapted to receive a gear, indicated in dotted lines at 50 in Figs. 2 and 3. This gear is secured upon the reduced portion 49 of the shaft 47 between a shoulder 51 on the shaft and a nut 52 threaded upon the threaded end portion 53 thereof. As in the case of the gear 26 and its shaft or spindle 18, the gear 50 is secured upon the shaft 47 either by means of a key, a pin, or other well-known means so as to rotate therewith.

The forward end of the shaft or spindle 47 extends into a brake housing 53 secured to the front end of the housing 44 and forming an enlarged continuation thereof. Within the brake housing 53 a hub 54 is keyed to the shaft 47, which hub supports a brake drum 55. Arranged within the drum 55 are a pair of substantially semi-cylindrical brake bands or shoes 56 having one pair of their adjacent ends secured to a supporting member 57 loosely carried by a supporting pin 58 extending inwardly of the drum and threadedly secured in the front plate 59 of the brake housing 53. The other pair of adjacent ends of the brake bands or shoes 56 are turned inwardly, as indicated at 60 (see Fig. 11), such inturned portions engaging the opposite sides of a cam member 61 carried by the inner end of a rotatable shaft 62 mounted in a forwardly extending supporting portion 63 formed on the cover plate 59 of the brake housing 53. The forward end of the shaft 62 has fixedly secured thereto a handwheel 64 whereby the shaft may be rotated and the cam 61, at its inner end, will engage the inturned portion 60 of the brake bands or shoes to expand the latter and to cause the brake lining 65 carried by the bands or shoes to engage with the inner periphery of the brake drum 55 to thereby impose a frictional load upon the shaft 47. As soon as the operator releases the handwheel 64, the bands or shoes will return to their normal position and relieve the shaft of the load imposed thereon.

The slide 5 is adjusted backwardly and forwardly on its ways by means of a lead screw 66 passing through a threaded nut 67 secured against rotation in an opening formed in the right hand end of the bed 4. The nut 67 is provided on its outer face with a counterbore 68 receiving an inwardly extending internally threaded sleeve portion 69 of a nut 70 held against relative rotation with respect to the nut 67 by means of pins 71 extending through the nut 70 and engaging in openings formed in a flanged portion 72 of the nut 67. The nut 67 is held against movement with respect to the bed 4 by means of bolts 73 passing through the four corners of the flanged portion 72 of the nut and received in threaded openings formed in the bed 4 (see Figs. 4, 5 and 6). The lead screw 66 is rotatably supported adjacent its outer end by ball bearing 74 arranged in a supporting housing 75 secured to the end of the slide 5 and extending transversely thereof. The lead screws 66 is held against endwise movement in the bearings 74 by a washer 76 carried by the housing and a washer 77 carried by the outer end plate 78 of the housing. A gear 79 is keyed to the lead screw 66 intermediate the bearings 74 and within the housing 75, such gear meshing with a worm 80 rotatably mounted in the housing 75 above the lead screw 66 and extending transversely thereto, the worm having an outwardly extending portion passing through an extension 81 formed on the front of the housing 75, which outwardly extending portion of the worm has a handwheel 82 fixed thereto whereby the worm may be rotated and in turn the gear 79 to rotate the lead screw 66 and move the slide 5 in the desired direction. The lead screw 66 extends through the housing 75 and outwardly beyond the same so that a drum 83 may be mounted on the outwardly extending end 84 of the lead screw to rotate with such screw. This drum is suitably graduated, as will later be explained, and there is a pointer 85 for the purpose of enabling a reading of the graduations on the drum. The pointer 85 is carried by a rod 86 which extends over the drum and is secured at its inner end to the housing 75. The pointer 85 is adjustably arranged upon the rod 86 and it is thus possible to vary the position of the pointer with respect to the graduations on the drum to thereby compensate for any inaccuracies in the lead screw 66, as will be explained more in detail during the explanation of the operation of the machine.

The front of the slide 5 adjacent the slide 32 is provided with a vernier 88 which cooperates with a scale 87 mounted in the front of the bed 4, as clearly shown in Fig. 1. The purpose of this scale and vernier and of the graduated drum and pointer will become clearly apparent during the description of the operation of the machine now to follow.

When it is desired to test gears for silence of operation and also for eccentricity, one of the gears, as for example the gear 26, is secured upon the shaft 18 and the other of the gears, as for example the gear 50, is secured upon the shaft 47. The slide 5 is then adjusted so as to bring the axis of the gear 50, namely the shaft 47, toward or away from the axis of the gear 26, in this instance, the shaft 18, an amount sufficient to bring the two gears into mesh at the desired center distance. When the slide has been thus adjusted, the operator may check, either by reading the vernier and scale upon the front of the machine or by taking his reading from the graduated drum 83 and pointer 85, the center distance between the gears as called for by the specifications of the gears. After the machine has thus been adjusted, the operator sets the motor 6 in operation by means of the switch 30 upon the front of the machine, with the result that the gear 26 is driven by the shaft 18 and since this gear is in mesh with the gear 50, the latter gear and the shaft 47 are driven therefrom. The two gears being in rotative mesh, the operator now imposes a load upon the shaft 47 by means of the braking mechanism arranged in the brake housing 53, such imposition of a load being effected by the operator by merely turning the handwheel 64 to apply the brake to the shaft 47. When the gear 26 is driving the gear 50 with the load imposed thereon, the operator is enabled to test the gears for silence of operation, under conditions approximating actual operating conditions. Should the gears be eccentric or otherwise untrue, their operation will cause the gear 50 to move with respect to the gear 26 and such movement will result in moving the slide 32 against the tension of the springs 41 with the result that the connecting member 39, carried by the end plate 38 of the slide, will actuate the pointer of a dial indicator 89 secured upon the upwardly extending portion 43 of the slide 5. Readings as to the degree of this movement may be readily obtained by the operator from watching the dial indicator 89.

It will be seen that a machine constructed in accordance with the embodiment hereinbefore specifically described includes relatively few parts of simple construction and design and which, while serving as a lapping machine enables the gears to be tested under what approximates actual working conditions. Furthermore, the entire operation of the machine and the reading of the different scales and indicating devices thereon may be performed by a single operator stationed in front of the machine since all of the necessary controlling elements and indicating attachments are located at the front of the machine.

Although a preferred embodiment of the invention has been illustrated and described herein, it should be understood that the invention is susceptible of various modifications and adaptations within the scope of the appended claims.

Having thus described my invention, what I claim is:

1. A gear testing and lapping machine comprising a base, a shaft rotatably arranged on said base and adapted to support a gear, a slide on said base movable transversely to said shaft a second slide arranged on said first slide to move independently thereof, and transversely to said shaft, means for positively limiting movement of said second slide in one direction, tensioned means resisting movement of said second slide in the opposite direction and normally maintaining the same in engagement with said first named means and stationary with respect to said first slide, a shaft carried by said second slide parallel to said first mentioned shaft and adapted to support a gear, means for moving said first named slide to bring said gears into mesh, whereby gear irregularities will move said second slide against said tensioned means, and an indicating device for indicating the amount of such movement.

2. A gear testing and lapping machine comprising a base, a positively driven shaft rotatably arranged on said base and adapted to support a gear, a slide on said base movable transversely to said shaft, a second slide arranged on said first slide to move independently thereof and transversely to said shaft, means for positively limiting movement of said second slide in one direction, tensioned means resisting movement of said second slide in the opposite direction and normally maintaining the same in engagement with said first named means and stationary with respect to said first slide, a shaft rotatably carried by said second slide parallel to said first named shaft and adapted to support a gear, a brake mechanism associated with said second shaft for imposing a load thereon, means for moving said first named slide to bring said gears in mesh, whereby gear irregularities will move said second slide against said tensioned means, and an indicating device for indicating the amount of such movement.

3. A gear testing and lapping machine comprising a base, a positively driven shaft rotatably arranged on said base and adapted to support a gear, a slide on said base movable transversely to said shaft, a second slide arranged on said first slide to move independently thereof and transversely to said shaft, means for positively limiting movement of said second slide in one direction, tensioned means resisting movement of said second slide in the opposite direction and normally maintaining the same in engagement with said first named means and stationary with respect to said first slide, a shaft rotatably carried by said second slide parallel to said first named shaft and adapted to support a gear, a brake mechanism associated with said second shaft for imposing a load thereon, a lead screw associated with said first named slide and said base, means for rotating said screw to thereby move said first slide and bring the gears into and out of mesh, a plurality of separate indicating devices for indicating the center distance of said gears in mesh, and an indicating device for indicating the amount of independent movement of said second slide, all of said indicating devices being readable and said brake mechanism and said lead screw operating means being operable from one side of the machine.

OLIVER G. SIMMONS.